US012549291B2

(12) United States Patent
Shrivastava et al.

(10) Patent No.: US 12,549,291 B2
(45) Date of Patent: Feb. 10, 2026

(54) ENHANCED SIDELINK HYBRID AUTOMATIC REPEAT REQUEST WITH INTEGRATED USER EQUIPMENT-TO-USER EQUIPMENT RELAY

(71) Applicant: Nokia Technologies Oy, Espoo (FI)

(72) Inventors: Rudraksh Shrivastava, Erligheim (DE); Vinh Van Phan, Oulu (FI); Ling Yu, Kauniainen (FI); Sudeep Hegde, Stuttgart (DE); Lianghai Ji, Aalborg (DK); Berthold Panzner, Holzkirchen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 320 days.

(21) Appl. No.: 18/258,825

(22) PCT Filed: Dec. 22, 2020

(86) PCT No.: PCT/US2020/066711
§ 371 (c)(1),
(2) Date: Jun. 22, 2023

(87) PCT Pub. No.: WO2022/139825
PCT Pub. Date: Jun. 30, 2022

(65) Prior Publication Data
US 2024/0048285 A1 Feb. 8, 2024

(51) Int. Cl.
*H04W 88/04* (2009.01)
*H04L 1/1825* (2023.01)
(52) U.S. Cl.
CPC ........... *H04L 1/1825* (2013.01); *H04W 88/04* (2013.01)
(58) Field of Classification Search
CPC ............................ H04L 1/1825; H04L 12/28
(Continued)

(56) References Cited

U.S. PATENT DOCUMENTS

2016/0157218 A1\* 6/2016 Nam ................... H04B 7/0632
370/329
2017/0310427 A1 10/2017 Wakabayashi et al.
(Continued)

FOREIGN PATENT DOCUMENTS

EP          2340629 B1   6/2019
WO     2010/034339 A1   4/2010

OTHER PUBLICATIONS

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.
(Continued)

*Primary Examiner* — Dang T Ton
(74) *Attorney, Agent, or Firm* — Carter, DeLuca & Farrell LLP

(57) ABSTRACT

A method may include initiating, by a transmitter user equipment, a hybrid automatic repeat request process for groupcasting a transport block over seedbank to one or more relay user equipment and at least one remote user equipment. The method may also include performing a first groupcast transmission of the transport block using the hybrid repeat request process. The method may further include monitoring feedback from the one or more relay user equipment and the at least one remote user equipment at a first time instance and at a second time instance. In addition, the method may include generating a retransmission strategy of the transport block depending on the feedback monitored at the first time instance and the second time instance. Further, the method may include controlling retransmission of the transport block using the hybrid automatic repeat request process based on the retransmission strategy.

1 Claim, 7 Drawing Sheets

(58) Field of Classification Search
USPC .................. 370/329, 400, 401, 402, 403
See application file for complete search history.

(56) References Cited

U.S. PATENT DOCUMENTS

2023/0254838 A1* 8/2023 Kim ............... H04W 72/12
370/329
2023/0262659 A1* 8/2023 Wang ............. H04W 72/56
370/329

OTHER PUBLICATIONS

"New SID: Study on NR sidelink relay", 3GPP TSG RAN Meeting #86, RP-193253, Agenda: 9.1.2, OPPO, Dec. 9-12, 2019, pp. 1-5.
"Feature lead summary for AI 7.2.4.5 Physical layer procedures for sidelink", 3GPP TSG RAN WG1 #99, R1-1913280, Agenda: 7.2.4.5, LG Electronics, Nov. 18-22, 2019, 38 pages.
"Remaining MAC issues", 3GPP TSG-RAN WG2 Meeting #110 electronic, R2-2005297, Agenda: 6.4.3.1, vivo, Jun. 1-12, 2020, 18 pages.
"3rd Generation Partnership Project; Technical Specification Group Radio Access Network; NR; Multiplexing and channel coding (Release 16)", 3GPP TS 38.212, V16.3.0, Sep. 2020, pp. 1-152.
International Search Report and Written Opinion received for corresponding Patent Cooperation Treaty Application No. PCT/US2020/066711, dated Sep. 24, 2021, 12 pages.
"Discovery Model and Procedure in NR Sidelink Relaying", 3GPP TSG RAN WG2#111-e, R2-2006868, Agenda: 8.7.4, Fujitsu, Aug. 17-28, 2020, pp. 1-5.
Office Action received for corresponding European Patent Application No. 20845317.5, dated Apr. 22, 2024, 5 pages.
Office Action received for corresponding European Patent Application No. 20845317.5, dated Oct. 15, 2024, 4 pages.
Notice of Allowance received for corresponding European Patent Application No. 20845317.5, dated Jun. 11, 2025, 8 pages.

* cited by examiner

ENHANCED SIDELINK HYBRID AUTOMATIC REPEAT REQUEST WITH INTEGRATED USER EQUIPMENT-TO-USER EQUIPMENT RELAY

RELATED APPLICATION

This application was originally filed as PCT Application No. PCT/US2020/066711, filed on Dec. 22, 2020, of which is incorporated herein by reference in its entirety.

FIELD

Some example embodiments may generally relate to mobile or wireless telecommunication systems, such as Long Term Evolution, LTE, or fifth generation, 5G, radio access technology or new radio, NR, access technology, or other communications systems. For example, certain embodiments may relate to apparatuses, systems, and/or methods for enhanced sidelink, SL, hybrid automatic repeat request, HARQ, with integrated user equipment (UE)-to-UE relay.

BACKGROUND

Examples of mobile or wireless telecommunication systems may include the Universal Mobile Telecommunications System (UMTS) Terrestrial Radio Access Network, UTRAN, Long Term Evolution, LTE, Evolved UTRAN, E-UTRAN, LTE-Advanced, LTE-A, MulteFire, LTE-A Pro, and/or fifth generation, 5G, radio access technology or new radio (NR) access technology. 5G wireless systems refer to the next generation, NG, of radio systems and network architecture. 5G is mostly built on a new radio, NR, but the 5G (or NG) network can also build on E-UTRAN radio. It is estimated that NR will provide bitrates on the order of 10-20 Gbit/s or higher, and will support at least enhanced mobile broadband, eMBB, and ultra-reliable low-latency-communication, URLLC, as well as massive machine type communication, mMTC. NR is expected to deliver extreme broadband and ultra-robust, low latency connectivity and massive networking to support the Internet of Things, IoT. With IoT and machine-to-machine, M2M, communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments are directed to a method. The method may include initiating, by a transmitter user equipment, a hybrid automatic repeat request process for groupcasting a transport block over sidelink to one or more relay user equipment and at least one remote user equipment. The method may also include performing a first groupcast transmission of the transport block using the hybrid repeat request process. The method may further include monitoring feedback from the one or more relay user equipment and the at least one remote user equipment at a first time instance and at a second time instance. In addition, the method may include generating a retransmission strategy of the transport block depending on the feedback monitored at the first time instance and the second time instance. Further, the method may include controlling retransmission of the transport block using the hybrid automatic repeat request process based on the retransmission strategy.

Other example embodiments are directed to an apparatus that may include at least one processor and at least one memory including computer program code. The at least one memory and the computer program code are configured, with the at least one processor to cause the apparatus at least to initiate a hybrid automatic repeat request process for groupcasting a transport block over sidelink to one or more relay user equipment and at least one remote user equipment. The apparatus may also be caused to perform a first groupcast transmission of the transport block using the hybrid repeat request process. The apparatus may further be caused to monitor feedback from the one or more relay user equipment and the at least one remote user equipment at a first time instance and at a second time instance. In addition, the apparatus may be caused to generate a retransmission strategy of the transport block depending on the feedback monitored at the first time instance and the second time instance. Further, the apparatus may be caused to control retransmission of the transport block using the hybrid automatic repeat request process based on the retransmission strategy.

Other example embodiments are directed to an apparatus. The apparatus may include means for initiating a hybrid automatic repeat request process for groupcasting a transport block over sidelink to one or more relay user equipment and at least one remote user equipment. The apparatus may also include means for performing a first groupcast transmission of the transport block using the hybrid repeat request process. The apparatus may further include means for monitoring feedback from the one or more relay user equipment and the at least one remote user equipment at a first time instance and at a second time instance. In addition, the apparatus may include means for generating a retransmission strategy of the transport block depending on the feedback monitored at the first time instance and the second time instance. Further, the apparatus may include means for controlling retransmission of the transport block using the hybrid automatic repeat request process based on the retransmission strategy.

In accordance with other example embodiments, a non-transitory computer readable medium may be encoded with instructions that may, when executed in hardware, perform a method. The method may include initiating, by a transmitter user equipment, a hybrid automatic repeat request process for groupcasting a transport block over sidelink to one or more relay user equipment and at least one remote user equipment. The method may also include performing a first groupcast transmission of the transport block using the hybrid repeat request process. The method may further include monitoring feedback from the one or more relay user equipment and the at least one remote user equipment at a first time instance and at a second time instance. In addition, the method may include generating a retransmission strategy of the transport block depending on the feedback monitored at the first time instance and the second time instance. Further, the method may include controlling retransmission of the transport block using the hybrid automatic repeat request process based on the retransmission strategy.

Other example embodiments may be directed to a computer program product that performs a method. The method may include initiating, by a transmitter user equipment, a hybrid automatic repeat request process for groupcasting a transport block over sidelink to one or more relay user equipment and at least one remote user equipment. The method may also include performing a first groupcast transmission of the transport block using the hybrid repeat request process. The method may further include monitoring feedback from the one or more relay user equipment and the at least one remote user equipment at a first time instance and at a second time instance. In addition, the method may include generating a retransmission strategy of the transport block depending on the feedback monitored at the first time instance and the second time instance. Further, the method may include controlling retransmission of the transport block using the hybrid automatic repeat request process based on the retransmission strategy.

Other example embodiments may be directed to an apparatus that may include circuitry configured to initiate a hybrid automatic repeat request process for groupcasting a transport block over sidelink to one or more relay user equipment and at least one remote user equipment. The apparatus may also include circuitry configured to perform a first groupcast transmission of the transport block using the hybrid repeat request process. The apparatus may further include circuitry configured to monitor feedback from the one or more relay user equipment and the at least one remote user equipment at a first time instance and at a second time instance. In addition, the apparatus may include circuitry configured to generate a retransmission strategy of the transport block depending on the feedback monitored at the first time instance and the second time instance. Further, the apparatus may include circuitry configured to control retransmission of the transport block using the hybrid automatic repeat request process based on the retransmission strategy.

Certain example embodiments may be directed to a method. The method may include detecting, by a relay user equipment, a hybrid automatic repeat request process initiated from a transmitter user equipment for groupcast of a transport block over sidelink to one or more relay user equipment and at least one remote user equipment. The method may also include receiving the transport block according to based on hybrid automatic repeat request related configuration for the hybrid automatic repeat request process. The method may further include based on a successful receipt of the transport block, monitoring feedback from the at least one remote user equipment or other relay user equipment to the transmitter user equipment at a first time instance, and transmitting the feedback to the transmitter user equipment at a second time instance. In addition, the method may include based on an unsuccessful receipt of the transport block, transmitting feedback to the transmitter user equipment at the first time instance.

Other example embodiments may be directed to an apparatus. The apparatus may include at least one processor and at least one memory including computer program code. The at least one memory and computer program code may be configured to, with the at least one processor, cause the apparatus at least to detect a hybrid automatic repeat request process initiated from a transmitter user equipment for groupcast of a transport block over sidelink to one or more relay user equipment and at least one remote user equipment. The apparatus may also be caused to receive the transport block according to based on hybrid automatic repeat request related configuration for the hybrid automatic repeat request process. The apparatus may further be caused to, based on a successful receipt of the transport block, monitor feedback from the at least one remote user equipment or other relay user equipment to the transmitter user equipment at a first time instance, and transmit the feedback to the transmitter user equipment at a second time instance.

In addition, the apparatus may be caused to, based on an unsuccessful receipt of the transport block, transmit feedback to the transmitter user equipment at the first time instance.

Other example embodiments may be directed to an apparatus. The apparatus may include means for detecting a hybrid automatic repeat request process initiated from a transmitter user equipment for groupcast of a transport block over sidelink to one or more relay user equipment and at least one remote user equipment. The apparatus may also include means for receiving the transport block according to based on hybrid automatic repeat request related configuration for the hybrid automatic request repeat process. The apparatus may further include means for based on a successful receipt of the transport block, monitoring feedback from the at least one remote user equipment or other relay user equipment to the transmitter user equipment at a first time instance, and transmitting the feedback to the transmitter user equipment at a second time instance. In addition, the apparatus may include means for based on an unsuccessful receipt of the transport block, transmitting feedback to the transmitter user equipment at the first time instance.

In accordance with other example embodiments, a non-transitory computer readable medium may be encoded with instructions that may, when executed in hardware, perform a method. The method may include detecting, by a relay user equipment, a hybrid automatic repeat request process initiated from a transmitter user equipment for groupcast of a transport block over sidelink to one or more relay user equipment and at least one remote user equipment. The method may also include receiving the transport block according to based on hybrid automatic repeat request related configuration for the hybrid automatic repeat request process. The method may further include based on a successful receipt of the transport block, monitoring feedback from the at least one remote user equipment or other relay user equipment to the transmitter user equipment at a first time instance, and transmitting the feedback to the transmitter user equipment at a second time instance. In addition, the method may include based on an unsuccessful receipt of the transport block, transmitting feedback to the transmitter user equipment at the first time instance.

Other example embodiments may be directed to a computer program product that performs a method. The method may include detecting, by a relay user equipment, a hybrid automatic repeat request process initiated from a transmitter user equipment for groupcast of a transport block over sidelink to one or more relay user equipment and at least one remote user equipment. The method may also include receiving the transport block according to based on hybrid automatic repeat request related configuration for the hybrid automatic repeat request process. The method may further include based on a successful receipt of the transport block, monitoring feedback from the at least one remote user equipment or other relay user equipment to the transmitter user equipment at a first time instance, and transmitting the feedback to the transmitter user equipment at a second time instance. In addition, the method may include based on an unsuccessful receipt of the transport block, transmitting feedback to the transmitter user equipment at the first time instance.

Other example embodiments may be directed to an apparatus that may include circuitry configured to detect a hybrid automatic repeat request process initiated from a transmitter user equipment for groupcast of a transport block over sidelink to one or more relay user equipment and at least one remote user equipment. The apparatus may also include circuitry configured to receive the transport block according to based on hybrid automatic repeat request related configuration for the hybrid automatic repeat request process. The apparatus may further include circuitry configured to, based on a successful receipt of the transport block, monitor feedback from the at least one remote user equipment or other relay user equipment to the transmitter user equipment at a first time instance, and transmit the feedback to the transmitter user equipment at a second time instance. In addition, the apparatus may include circuitry configured to based on an unsuccessful receipt of the transport block, transmit feedback to the transmitter user equipment at the first time instance.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for enhanced sidelink, SL, hybrid automatic repeat request, HARQ, option-1/option-2 with integrated user equipment (UE)-to-UE relay, e.g., for vehicle-to-everything, V2X, industrial internet-of-things, IioT, or public-safety, PS, mission-critical group communications of devices/UEs.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments. Further, the phrase "based on" may indicate a condition and/or situation. For example, "based on" may mean "if", and "based on" may be interchangeable with the conditional word "if".

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain example embodiments may relate to sidelink, SL, hybrid automatic repeat request, HARQ, for SL groupcast, such as in scenarios where group members may be scattered or arranged in an extended SL service coverage area. As such, certain group members may be located beyond a direct reachability or SL transmission range of a transmitter. Some use cases of SL groupcast may include, for example, mission-critical group communications for public-safety in a hostile environment, platooning, and others.

Figure 1B:
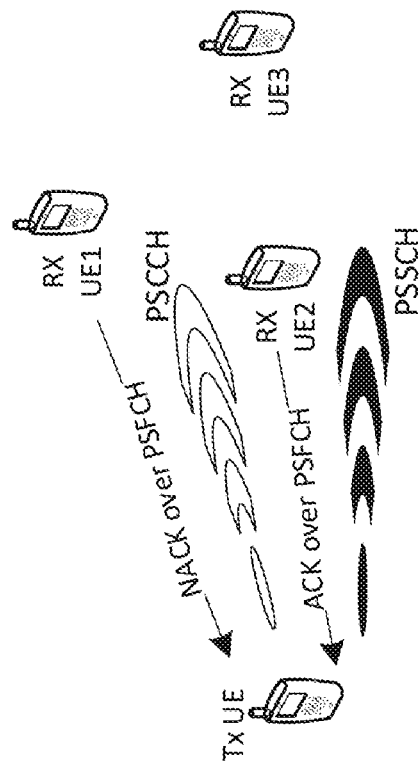
FIG. 1(b) illustrates an example communication under option-2 for SL HARQ.
Figure 1A:
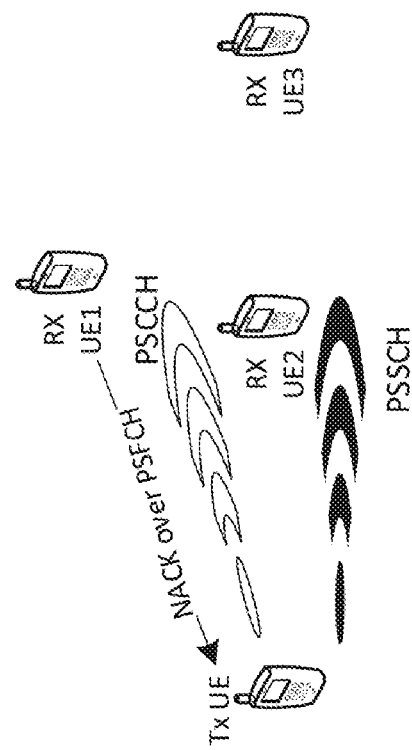
FIG. 1(a) illustrates an example communication under option-1 for sidelink (SL) hybrid automatic repeat request (HARQ).

FIG. 1(a) illustrates an example communication under option-1 for SL HARQ, and FIG. 1(b) illustrates an example communication under option-2 for SL HARQ. $3^{rd}$ Generation Partnership Project, 3GPP, Rel-16 NR SL describes options of SL HARQ with feedback for SL groupcast. These options include option-1 and option-2. As illustrated in FIG. 1(a), under SL HARQ option-1, a common physical sidelink feedback channel (PSFCH) resource may be used for the group members, e.g., receiving, Rx, UEs, to send negative acknowledgement (NACK)-only feedback to the transmitting (Tx)-UE if a transmission from the Tx-UE is not received correctly. In this option, the MAC layer of the Tx-UE may set a range so that group members within the range may receive HARQ transmission from the Tx-UE.

As illustrated in FIG. 1(b), under SL HARQ option-2, a dedicated PSFCH resource may be used for each group member, Rx UE, to send a positive acknowledgement, ACK, or NACK to the Tx-UE if a transmission from the Tx-UE is received correctly or incorrectly. If the HARQ retransmission is not detected at the Rx UE (e.g., sidelink control information, SCI, sent by the Tx-UE to schedule the HARQ transmission is not received by the detected Rx UE), the Tx-UE may detect a discontinuous transmission (DTX) feedback on the PSFCH of the Rx UE.

Figure 2:
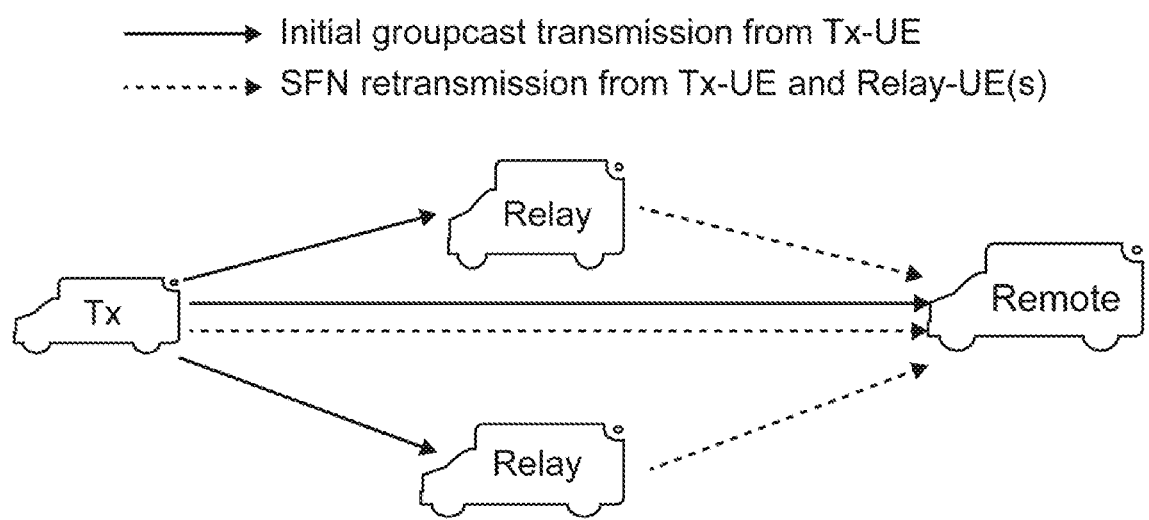
FIG. 2 illustrates an example of single frequency network (SFN) based retransmission.

FIG. 2 illustrates an example of single frequency network, SFN, retransmission. UE-to-UE relay may be used to support a SL groupcast with an extended range for the use cases described above. As such, the system scenario of the SL groupcast with an extended range may include a transmitter UE (Tx-UE), one or more relay UEs, such as Relay-UE or Relay-UEs, and normal group members, such as Remote-UEs. Further, it may be assumed that Relay-UEs are in direct range of the Tx-UE, whereas Remote-UEs may or may not be in direct range of the Tx-UE. In other words, a 2-hop relay may be considered. It may also be assumed that the HARQ option-1 may be used as the basis for the Tx-UE to send data to the group, as the HARQ option-1 may be simpler and preferable for large groups and flexible range (set by the Tx-UE) which is targeted for the use cases of interest.

However, since certain use cases of interest may be for real-time communications with low-latency and high-reliability requirements, having individual relay UEs, such as Relay-UE, to use separate HARQ processes independent from that of the Tx-UE to relay data received from the Tx-UE to other group members, may introduce notable latency and high resource consumption. Thus, certain example embodiments described herein may integrate UE-to-UE relays into the HARQ process that may be initiated and used by the Tx-UE to transmit data to the group over SL to avoid or eliminate the aforementioned issues. In addition, certain example embodiments may provide support for backward compatibility. As such, the SL relay-integrated HARQ process initiated by the Tx-UE may appear as a Rel-16 SL HARQ process to Remote-UE. Accordingly, certain enhancements for integrating relay into the HARQ process may be provided for Tx-UE and Relay-UE, and may be transparent to Remote-UE.

3GPP describes which SCI may be used for scheduling a SL HARQ transmission. For instance, with regard to SL control information on the physical sidelink control channel, PSCCH, SCI carried on PSCCH may be a $1^{st}$-stage SCI, which transports SL scheduling information. The fields defined in each of the $1^{st}$-stage SCI formats may be mapped to the information bits $a_0$ to $a_{A-1}$. For example, a field may be mapped in the order in which it appears in the description, with the first field mapped to the lowest order information bit $a_0$, and successive fields mapped to higher order information bits. The most significant bit of a field may be mapped to the lowest order information bit for that field (e.g., the most significant bit of the first field is mapped to $a_0$).

As to SCI format 1-A, this may be used for scheduling the physical sidelink shared channel, PSSCH, and $2^{nd}$-stage-SCI on PSSCH. Various information may be transmitted by means of the SCI format 1-A including, for example, priority-3 bits. Also included may be frequency resource assignment—

$$\left\lceil \log_2\left(\frac{N_{subChannel}^{SL}(N_{subChannel}^{SL}+1)}{2}\right)\right\rceil \text{ bits}$$

when the value of the higher layer parameter sl-MaxNumPerReserve is configured to 2; otherwise log 2(N subChannel SLN subChannel SL+12N subChannel SL+16) bits when the value of the higher layer parameter sl-MaxNumPerReserve is configured to 3.

A time resource assignment may further be transmitted by means of SCI format 1-A. for example, 5 bits may be transmitted when the value of the higher layer parameter sl-MaxNumPerReserve is configured to 2; otherwise 9 bits when the value of the higher layer parameter sl-MaxNumPerReserve is configured to 3. In other cases, resource reservation period may be transmitted including, for example, $\lceil \log_2 N_{rsv\_period}\rceil$ bits as defined in 3GPP, where $N_{rsv\_period}$ is the number of entries in the higher layer parameter sl-ResourceReservePeriodList, if higher layer parameter sl-MultiReserveResource is configured; 0 bit otherwise.

In further cases, SCI format 1-A may transmit information including a demodulation reference signal (DMRS) pattern including, for example, $\lceil \log_2 N_{pattern}\rceil$ bits as defined in 3GPP, where $N_{pattern}$ is the number of DMRS patterns configured by higher layer parameter sl-PSSCH-DMRS-TimePatternList. Additional information may include $2^{nd}$-stage SCI format (see Table 1), beta_offset indicator (see Table 2), number of DMRS ports (see Table 3), modulation and coding scheme (5 bits), additional MCS table indicator, PSFCH overhead indication (1 bit), and a reserved number of bits as determined by higher layer parameter sl-NumReservedBits, with value set to zero.

TABLE 1

$2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 2

Mapping of Beta_offset indicator values to indexes

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

TABLE 3

Number of DMRS port(s)

| Value of the Number of DMRS port field | Antenna ports |
|---|---|
| 0 | 1000 |
| 1 | 1000 and 1001 |

3GPP also describes SL control information on PSSCH. For example, SCI carried on PSSCH may be a $2^{nd}$-stage SCI, which transports SL scheduling information. Also described are $2^{nd}$-stage SCI formats, which may include fields mapped to the information bits $a_0$ to $a_{A-1}$. For example, each field may be mapped in the order in which it appears in the description, with the first field mapped to the lowest order information bit $a_0$, and each successive field may be mapped to higher order information bits. The most significant bit of each field may be mapped to the lowest order information bit for that field, e.g., the most significant bit of the first field is mapped to $a_0$.

As further described in 3GPP, SCI format 2-A may be used for decoding PSSCH with HARQ operation when HARQ-ACK information includes ACK or NACK, when HARQ-ACK information includes NACK, or when there is no feedback of HARQ-ACK information. For instance, the following information may be transmitted by means of the SCI format 2-A: HARQ process number (4 bits); new data indicator (1 bit); redundancy version (2 bits); source ID (8 bits); destination ID (16 bits), HARQ feedback enabled/disabled indicator (1 bit); cast type indicator (2 bits, as defined in Table 4); and channel state information, CSI, request (1 bit).

TABLE 4

Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Furthermore, 3GPP describes SCI format 2-B, which may be used for decoding of PSSCH with HARQ operation when HARQ-ACK information includes only NACK, or when there is no feedback of HARQ-ACK information. Certain information may be transmitted by means of the SCI format 2-B including, for example: HARQ process number (4 bits); new data indicator (1 bit); redundancy version (2 bits); source ID (8 bits); destination ID (16 bits); HARQ feedback enabled/disabled indicator (1 bit); zone ID (12 bits); and communication range requirement (4 bits).

According to certain example embodiments, UE-to-UE SL relay may be integrated into SL HARQ option-1 for SL groupcast with Rel-16 backward-compatibility support. The SL relay integrated HARQ may be referred to as SL HARQ option-3 for the Tx-UE and Relay-UE members while being seen as a regular SL HARQ option-1 to Remote-UE members. According to certain example embodiments, the method may relate to the Tx-UE and Relay-UE members of the SL groupcast. For instance, in certain example embodiments, the Tx-UE and Relay-UE members may be configured to use and identify a SL HARQ option-3 process, which may be distinguished from a SL HARQ option-1 process. For example, in SL HARQ option-3, dynamic configuration may be available. In particular, the dynamic configuration may use an explicit indication by suing, for example, one particular bit out of a set of reserved bits in SCI.

According to other example embodiments, the SL HARQ option-3 process may include an implicit indication using, for example, a pre-configured exclusive subset of the HARQ process numbers, such as IDs, or the communication range requirement in SCI. For example, the HARQ process numbers from 8 to 15 may be exclusively reserved for SL HARQ option-3 for the Tx-UE and Relay-UE members (on top of SL HARQ option-1 for Remote-UE members). In another example, a communication range threshold may be configured to the Tx-UE and Relay-UE members above which SL HARQ option-3 is used.

In certain example embodiments, the SL HARQ option-3 process may also include a semi-static configuration when the Tx-UE and Relay-UE are configured during relay UE (re)selection procedure. For example, when the Relay-UE is (re)selected as the relay UE for SL groupcast, the Tx-UE and Relay-UE may be configured with the SL HARQ option-3 that may be applied for SL groupcast using groupcast destination L2 ID, or applied for the SL groupcast using the configured HARQ process number(s), such as IDs, or special communication range threshold(s). Alternatively, in other example embodiments, the Tx-UE may unicast/groupcast a command, for example, in a MAC control element, CE, to the Relay-UE(s) for activating/deactivating the use of SL HARQ option-3 dynamically.

According to certain example embodiments, the SL HARQ option-3 process may be based on either SL HARQ option-1 with NACK-only feedback on a common PSFCH, or SL HARQ option-2 with either ACK or NACK feedback on a dedicated PSFCH from an individual Relay-UE member to the Tx-UE. This (i.e., whether the initiated SL HARQ option-3 process is based on option-1 or option 2) may also be indicated in SCI using either an explicit indication using, for example, another particular bit out of the reserved bits in SCI or an implicit indication using, for example, different subsets of the exclusive subset of the HARQ process numbers (IDs), or the communication range requirement in SCI described above. Alternatively, in other example embodiments, if the semi-static/dynamic configuration option is used, it may also be configured to Tx-UE and Relay-UE whether SL HARQ option-3 is based on SL HARQ option-1 or option-2.

In certain example embodiments, the PSFCH resource for individual Relay-UE members, either common or dedicated according to the selected option of the SL HARQ option-3, may be arranged so that it occurs at a later second time instance after a first time instance of the common PSFCH resource for individual Remote-UE members as in SL HARQ option-1. Thus, for a HARQ retransmission, the "first time instance" may refer to the feedback of Remote-UEs, and the "second time instance" may refer to the feedback of Relay-UEs. According to certain example embodiments, the first time instance may be arranged according to SL HARQ option-1 feedback resource configuration for backward capability support of legacy Rel-16 Remote-UEs. Further, the second time instance may be arranged with two options. For example, in a first option, the second time instance may be arranged based on a new pre-configured mapping rule for option-3, as compared to that used for option-1 and option-2. In a second option, the arrangement of the second time instance for option-3 may be dynamically configured by the Tx-UE. The dynamically configured second time instance may ensure that the first time instance and the second time instance do not occur simultaneously.

According to certain example embodiments, operation of the Tx-UE and Relay-UE may be based on the SL relay integrated HARQ process initiated by the Tx-UE to transmit or groupcast a TB to the group. In other words, the HARQ process appears as a SL HARQ option-3 process to Relay-UE members and a SL HARQ option-1 process to Remote-UE members. For instance, in certain example embodiments, the Tx-UE may schedule at least two transmissions for the TB in the initiated HARQ process. The first transmission may be transmitted by the Tx-UE to the group, which may include Relay-UEs and Remote-UEs, referred to as the first groupcast transmission. The retransmission may be transmitted by the Tx-UE and/or Relay-UE(s) to the rest of the group in a SFN fashion, as coordinated by the Tx-UE. The SFN fashion means that the transmitters of the Tx-UE and/or Relay-UE(s) transmit the same data using the same formats and resources simultaneously so that it appears to the receiver UE(s) as a single transmission. Thus, the second retransmission appears to the receiver UE(s) as a normal HARQ retransmission from the Tx-UE. The involvement of the Relay-UE(s) in retransmission, also understood as relaying, may be transparent to the receiver UE(s), which includes at least all the Remote-UEs. This allows for the support of backward compatibility. According to certain example embodiments, the retransmission may be coordinated or controlled by the Tx-UE even if no NACK is received by the Tx-UE from any group member of Relay-UE and Remote-UEs for the first groupcast transmission. This is because it may be anticipated that a transmission, including SCI, from the Tx-UE without relaying, such as the first groupcast transmission, may not reach some members of the group outside of the direct range of the Tx-UE and therefore that no NACK is received by the Tx-UE for the first groupcast transmission does not reassure that all members of the group within an extended range receive the first groupcast transmission.

In certain example embodiments, the Tx-UE may schedule the second HARQ retransmission according to the HARQ option-1 within a HARQ roundtrip time of the scheduled resources of the first HARQ transmission according to the HARQ option-3. This means that the second time instance of PSFCH for Relay-UE(s) is late enough that the second HARQ retransmission after the first time instance of PSFCH for Remote-UE may be scheduled by the Tx-UE. It is noted that a Relay-UE which has not received the TB correctly from the Tx-UE may behave like a Remote-UE until it receives the TB correctly and may send NACK at the first time instance. However, the time difference of the scheduled resource between the first and second HARQ transmissions may be sufficient to allow the Relay-UE to prepare the second HARQ retransmission based on a correctly received TB of the first HARQ transmission from the Tx-UE.

According to certain example embodiments, the Tx-UE may schedule a subsequent HARQ retransmission, for example, after the two first and second HARQ (re)transmissions, upon receiving NACK on either the first time instance from Remote-UE member(s), or on the second time instance from Relay-UE member(s) for a previously scheduled HARQ retransmission. If NACK is not received on the first time instance but on the second time instance for a scheduled HARQ retransmission, the Tx-UE may not take part in transmitting the subsequent HARQ retransmission. In certain example embodiments, the Tx-UE may also monitor HARQ retransmission by Relay-UE(s) when not taking part in transmitting the HARQ retransmission. The Tx-UE may monitor this HARQ retransmission since the Tx-UE may have full awareness of the coordinated/synchronized resource allocation with either on-demand allocated resources or pre-configured resources being used for the HARQ re-transmission by Relay-UE(s). According to other example embodiments, the Tx-UE may terminate the initiated HARQ process either when no NACK is received on the first time instance and the second time instance for the last scheduled HARQ retransmission, or when the maximum number of HARQ (re)transmissions is reached for the initiated HARQ process.

As noted above, in certain example embodiments, operation of the Relay-UE may be based on the SL relay integrated HARQ process initiated by the Tx-UE to transmit a TB to the group (the HARQ process appears as a SL HARQ option-3 process to Relay-UE members and a SL HARQ option-1 process to Remote-UE members). For example, in certain example embodiments, the Relay-UE may be configured to behave as a Remote-UE until it correctly/successfully receives the TB. This means that the Relay-UE may receive the TB sent by the Tx-UE and/or other Relay-UE(s) in SFN fashion, as coordinated by the Tx-UE. The Relay-UE may also send NACK to the Tx-UE on the first time instance if it does not correctly/successfully receive the TB. In addition, the Relay-UE may send a second NACK to the Tx-UE on the second time instance if by then the Relay-UE does not correctly/successfully receive the TB.

According to certain example embodiments, the Relay-UE may be configured to monitor NACK from the Remote-UEs to the Tx-UE on the first time instance as soon as the Relay-UE receives the TB from the Tx-UE correctly. Further, depending on the time difference of the scheduled resources between the first and the second transmissions, the Relay-UE may adapt its operation for the HARQ option-3. For example, if a subsequent HARQ retransmission of the TB is scheduled (and coordinated) by the Tx-UE before the second time instance (and after the previous first time instance), the Relay-UE may transmit the subsequent HARQ retransmission before sending its HARQ feedback to the Tx-UE on the second time instance. This may be carried out by the Relay-UE, regardless of whether NACK or no NACK was received by the Relay-UE on the previous first time instance at least in case the Relay-UE receives the TB correctly on the first HARQ transmission from the Tx-UE, and the subsequent HARQ retransmission is the second HARQ transmission. Otherwise, the Relay-UE may transmit the subsequent HARQ transmission if NACK is received on the previous first time instance.

According to certain example embodiments, the NACK on the second time instance may represent a confirmation that the Relay-UEs involved in the monitoring, reporting, and retransmission process have successfully received the TB in the first groupcast transmission by the Tx-UE. This is because the Relay-UEs (among the selected set of Relay-UEs) that have successfully received the TB may perform or are configured to perform the monitoring and reporting process. If the selected set of Relay-UE(s) have not received the TB successfully, they may not perform monitoring, and therefore there may be no ACK/NACK/feedback from these Relay-UE(s) on the second time instance.

In certain example embodiments, if HARQ option-3 may be based on HARQ option-2, and there is no feedback by the Relay-UE(s) in the second time instance on dedicated PSFCH resources, the Tx-UE may interpret it as an unsuccessful reception of the TB by the Relay-UE(s) (because the Tx-UE knows that the Relay-UE(s) did not monitor the feedback from the Remote-UE). In this case, the Tx-UE may also identify which specific Relay-UE(s) have not received the TB. Further, NACK in option-2 may mean that it is an ACK for the Relay-UE(s), and the NACK monitored from the remote UE (in the first time instance) combined. If there is no NACK from the remote UE(s) at all, the Relay-UE(s) ma send an ACK or DTX (no feedback).

According to certain example embodiments, if HARQ option-3 is based on HARQ option-1, then there may be no feedback by the Relay-UE(s) in the second time instance on common PSFCH resources, and the TX-UE may interpret it as an unsuccessful reception of the TB by at least one of the Relay-UE(s) and/or Remote-UE within the set of selected Relay-UE(s). However, the Tx-UE may not identify which specific Relay-UE(s) have not received the TB. If there is no NACK from any Remote-UE(s), the Relay-UE(s) may send no feedback in this case. In addition, the Tx-UE may assume that the Relay-UE(s) as well as Remote-UE(s) have received the TB successfully.

In certain example embodiments, the Relay-UE may send a HARQ feedback to the Tx-UE on the second time instance depending on whether NACK or no NACK was received by the Relay-UE on the previous first time instance. This may also be applied for any subsequent HARQ retransmission after the first and second (re)transmissions. In some example embodiments, the Relay-UE may send NACK on the second time instance if NACK is received on the previous first time instance. Thus, NACK on the second time instance may indicate to the Tx-UE that the Relay-UE has monitored NACK on the first time instance from the Remote-UE. In certain cases, the subsequent HARQ retransmission may be needed. In these situations, the Relay-UE may keep DTX or send ACK on the second time instance if no NACK is received on the previous first time instance. In certain example embodiments, the former option, for example keeping DTX, may be applied when the HARQ option-3 is based on the HARQ option-1. Further, the former option may be applied when the HARQ option-3 is based on the HARQ option-2 as well, at least for the first HARQ transmission if the Relay-UE correctly/successfully receives the TB.

Figure 3:
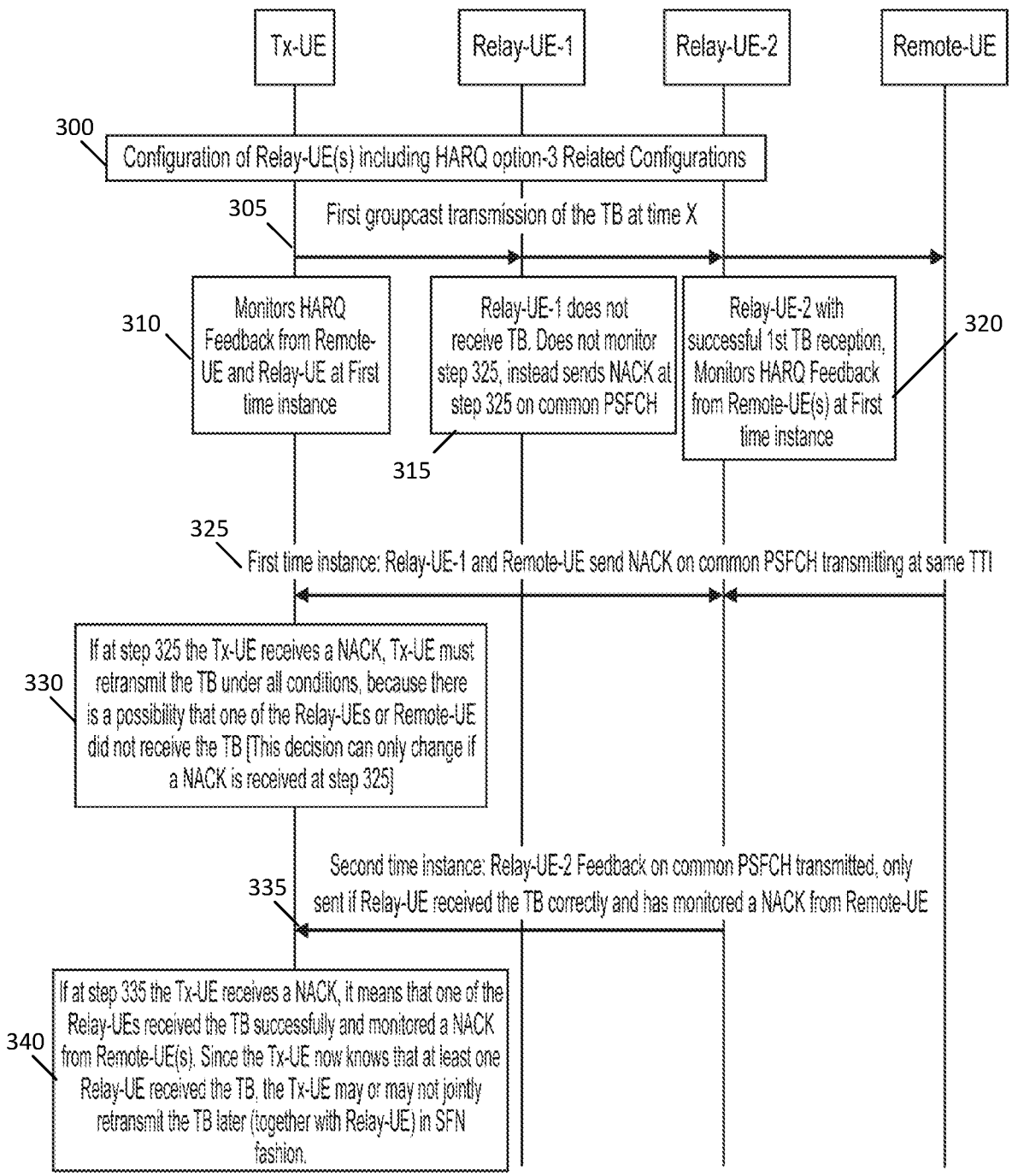
FIG. 3 illustrates a signal flow diagram between network elements, according to certain example embodiments.

FIG. 3 illustrates an example signal flow diagram between network elements, according to certain example embodiments. As illustrated in FIG. 3, at 300, the Tx-UE may configure Relay-UEs with HARQ option-3 related parameters. According to certain example embodiments, such mechanism may follow HARQ option-3 configurations. For example, Relay-UEs may be preconfigured to send PSFCH feedback to the Tx-UE using option-1 (common PSFCH) or option-2 (dedicated PSFCH) as for option-3 and known by the Tx-UE. Under this approach, the first time instance is for the HARQ feedback from Remote-UE(s) according to option-1 because it is the conventional feedback slot of the groupcast transmission initiated by the Tx-UE at 305 in FIG. 3. Thus, in the first time instance, Remote-UE(s) within the group may send NACK on the common PSFCH as shown at 325 in FIG. 3. The second time instance is for the HARQ feedback from Relay-UE(s) according to option-3 which may be based on either HARQ option-1 or option-2, as preconfigured to the Relay-UE(s) at 300.

According to certain example embodiments, since the Tx-UE may transmit a scheduled HARQ (re)transmission at time X, the Relay-UEs may be preconfigured to have their PSFCH feedback timeslot, the second time instance, for example, either on common or dedicated PSFCH resources depending on whether the HARQ option-3 is based on HARQ option-1 or option-2, to be at time X+n later than the PSFCH feedback timeslot of Remote-UEs at time X+m (m<n), the first time instance. In this case, the Relay-UEs may monitor the Remote-UE PSFCH feedback to the Tx-UE on the previous first time instance at X+m for one or more HARQ (re)transmissions. In certain example embodiments, it may be assumed that the Relay-UE(s) are preconfigured to transmit PSFCH feedback to the Tx-UE at a later time (e.g., second time instance) than Remote-UE PSFCH feedback, for example on the first instance, for the same HARQ transmission/process initiated by the Tx-UE.

As illustrated in FIG. 3, at 305, the Tx-UE may perform a first groupcast transmission at time X to all Relay-UE(s) and Remote-UE(s). To the Remote-UE(s), this transmission may appear as a standard groupcast transmission with HARQ option-1, whereas the Relay-UE(s) may be aware that this transmission corresponds to a HARQ option-3 process. At 310, the Tx-UE may monitor feedback from Remote-UE(s) and Relay-UE(s), respectively, at the first and second time instances on common PSFCH resources. That is, option-3 in FIG. 3 is based on option-1. At 315, Relay-UE-1 and the Remote-UE(s) may not receive the TB transmitted at 305. As such, Relay-UE-1 and Remote-UE(s) may send NACK to the Tx-UE at the first time instance. In addition, Relay-UE-1 may not monitor feedback at the first time instance (time X+m).

At 320, Relay-UE-2 may successfully receive the TB transmitted at 305 and, thus, Relay-UE-2 along with Tx-UE may monitor the common PSFCH resources at the first time instance (time X+m). At 325, at the first time instance (time X+m), Relay-UE-1 and Remote-UE(s) may transmit NACK for the unsuccessful reception of the TB transmitted by the Tx-UE. At 330, the Tx-UE and the monitoring Relay-UE-2 may receive the NACK on the common PSFCH resource at the first time instance (time X+m). In addition, at 330, the Tx-UE may retransmit the TB under all conditions because there may be a possibility that some of Remote-UEs are out of direct range of the Tx UE and therefore cannot receive the TB from the Tx UE directly.

At 335, at the second time instance (time X+n), Relay-UE-2 may send a NACK to the Tx UE since Relay-UE-2 has monitored and received a NACK on the common PSFCH resources at the first time instance (time X+m). In certain example embodiments, the NACK from Relay-UE at the second time instance may be interpreted by the Tx UE as a successful reception of the TB transmitted at 305 at some Relay-UE. At 340, the Tx-UE may have monitored NACK on both the first time instance, for example from Relay-UE-1/Remote-UE, and the second time instance, for example from Relay-UE-2. If at 335 the Tx-UE received a NACK at the second time instance, this may mean that some of the Relay-UE(s) received the TB successfully, and received a NACK from Remote-UE(s) at the first time instance earlier. Since the Tx-UE now knows that at least one Relay-UE received the TB, the Tx-UE may or may not jointly retransmit the TB later (together with Relay-UE) in SFN fashion. According to certain example embodiments, the Tx-UE may determine the next retransmission strategy, depending on the HARQ feedback monitored on the first and second time instances.

In certain example embodiments, the Tx-UE may preconfigure Relay-UEs in HARQ option-3 so that the Relay-UE may use HARQ option-2 to send its feedback to the Tx-UE even when the SCI of the Tx-UE indicates HARQ option-1, for example for the overall groupcast transmission by the Tx-UE. In an alternative, the Tx-UE may use, for example, reserved bits in the SCI sent to the groupcast members to indicate to the Relay-UEs that the preconfigured HARQ option-2 feedback may be used as for option-3 for the respective groupcast transmission from the Tx-UE.

According to certain example embodiments, if a Relay-UE is preconfigured to transmit its PSFCH feedback later than Remote-UEs feedback, then, upon successful reception of a TB from the Tx-UE, the Relay-UE may be configured to monitor the PSFCH feedback from the Remote-UE. In addition, according to other example embodiments, the Relay-UE may transmit HARQ feedback to the Tx-UE based on its own reception status. The Relay-UE may also transmit as a combination of its own status and the monitored HARQ feedback from Remote-UEs. Further, the Relay-UE may simply forward the monitored HARQ feedback from Remote-UEs to the Tx-UE.

In certain example embodiments, if the Relay-UE(s) successfully received the first groupcast transmission of the TB, it may opt out of the Remote-UE feedback monitoring process. In this case, the Relay-UE may implicitly or explicitly indicate that to the Tx-UE in addition to the ACK feedback to the Tx-UE. In other example embodiments, the feedback sent by the Relay-UE to the Tx-UE may be considered to be for the Relay-UE's own reception status until the Relay-UE sends ACK to the Tx-UE for the first time (this may confirm that the Relay-UE has successfully received the TB, providing that HARQ option-3 is based on option-2). Further, in some example embodiments, subsequent HARQ feedback of this Relay-UE for the corresponding HARQ retransmission of the TB, as scheduled by the Tx-UE, may be considered to be the feedback monitored by the Relay-UEs from the Remote-UEs. According to certain example embodiments, the Tx-UE may already know that this Relay-UE has received the TB. Thus, for subsequent HARQ retransmissions, the Relay-UE feedback may correspond to the Remote-UE feedback.

According to certain example embodiments, if a Relay-UE receives a retransmission request from the Tx-UE, the Relay-UE may send an SCI decodable by the Remote-UE before retransmitting the TB according to the retransmission request. In certain example embodiments, this may be done if it is not already preconfigured in step 300 in FIG. 3 to make the solution backward compatible. The retransmission request can be an SCI sent by the Tx-UE which may be associated with the upcoming HARQ (re)transmission to the Remote-UEs.

In certain example embodiments, the retransmission(s) performed by the Relay-UEs may be synchronized with Tx-UE retransmission(s) in an SFN manner even if no NACK is received by the Tx-UE from any group member (Relay-UE or Remote-UE) for the first HARQ transmission. In other example embodiments, the transmissions from the Tx-UE and Relay-UE in SFN may be the same on the bit-level, and transmitted using the same formats and time-frequency resources.

According to certain example embodiments, if HARQ option-3 with Relay-UE is preconfigured based on HARQ option-1, if the Relay-UE has successfully received the first HARQ transmission from the Tx-UE, and if the Relay-UE has monitored the Remote-UE NACK feedback sent to the Tx-UE for the first HARQ transmission, the Relay-UE may send NACK to the Tx-UE in its feedback for option-3. According to some example embodiments, this may be done instead of DTX. In other example embodiments, the NACK feedback for option-3 may represent the NACK for the Remote-UE. It may also implicitly indicate that the Relay-UE(s) has successfully received the TB, and was involved in the feedback monitoring procedure.

In certain example embodiments, if HARQ option-3 with Relay-UE is preconfigured based on HARQ option-2, if a Relay-UE-1 has successfully received the first HARQ transmission from the Tx-UE, and if the Relay-UE-1 has monitored the NACK feedback transmitted by another Relay-UE-2 (peer Relay-UE) in the group, then the Relay-UE-1 may forward the NACK received from Relay-UE-2 to the Tx-UE in the same way as Relay-UE-1 forwards the NACK from Remote-UEs to the Tx-UE. Further, the Relay-UE-1 may retransmit the TB to the Relay-UE-2, and possibly in coordination with the Tx-UE in the same way as TB retransmission to Remote-UEs. In addition, this NACK feedback may represent the NACK from the peer Relay-UE(s) which has not successfully received the TB.

According to certain example embodiments, when more than one Relay-UEs have successfully received the TB, the Tx-UE may select a subset of the most appropriate Relay-UE(s) for monitoring and retransmission of the TB for the group based on parameters such as load, channel quality, and/or sensing type/configured resources, QoS. This is applicable for the case that the SL HARQ option-3 is based on option-2. In this case, the Tx UE has full knowledge which of the relay UEs have received the TB due to dedicated HARQ feedback from the relay UEs. According to other example embodiments, when the SL HARQ option-3 is based on the SL HARQ option-1 and Relay-UE may send NACK on either the first or second time instance, the Tx-UE may determine whether to take part in subsequent HARQ retransmission based on from which time instance the NACK is received. For example, the Relay-UE may be configured to send NACK on the first time instance if it does not receive TB correctly while sending NACK on the second time instance if it receives TB correctly and also receives NACK from Remote-UE(s) on the first time instance. In this case, the Tx-UE may determine to take part in a subsequent HARQ retransmission if NACK is received on the first time instance for the previous HARQ (re)transmission. Otherwise, the Tx-UE may not take part in the subsequent HARQ retransmission, but instead coordinate the subsequent HARQ retransmission among Relay-UE(s) by allocating, coordinating, or preconfiguring the resources for the subsequent HARQ retransmission in SFN manner.

In certain example embodiments, when the SL HARQ option-3 is based on the SL HARQ option-2 and the Tx-UE is aware that the HARQ feedback on the second time instance from the Relay-UE is for the reception status of the Relay-UE or for Remote-UE(s), the Tx-UE may determine to schedule and coordinate a subsequent HARQ (re)transmission. However, the Tx-UE may not take part in transmitting the subsequent HARQ retransmission if no NACK is received on the first time instance, and NACK is received on the second time instance from the Relay-UE for Remote-UE(s).

According to certain example embodiments, when the SL HARQ option-3 is based on the SL HARQ option-1, and if a Relay-UE monitors a DTX on the first time instance, the Relay-UE may send a DTX on the second time instance. This DTX may be interpreted by the Tx-UE as an indication of successful reception of the TB by the Relay-UE(s) and Remote-UE(s). In other example embodiments, if the SL HARQ option-3 is based on option-2 and given that a Relay-UE has successfully received the TB from the Tx-UE, if the Relay-UE monitors a NACK from a Remote-UE/Relay-UE on the first time instance, the Relay-UE may send a NACK to the Tx-UE on the second time instance using dedicated HARQ feedback resources. This may indicate to the Tx-UE on the second time instance that the Relay-UE has received the TB from the Tx-UE and that the Relay-UE has monitored a NACK from the Remote-UE/Relay-UE on the first time instance. In other example embodiments, if the Relay-UE monitors a DTX from a Remote-UE/Relay-UE on the first time instance, the Relay-UE may send ACK or DTX to the Tx-UE on the second time instance using dedicated HARQ feedback resources. This may indicate to the Tx-UE that the Relay-UE has received the TB from the Tx-UE, and that the Relay-UE has monitored a DTX from the Remote-UE/Relay-UE.

Figure 4:
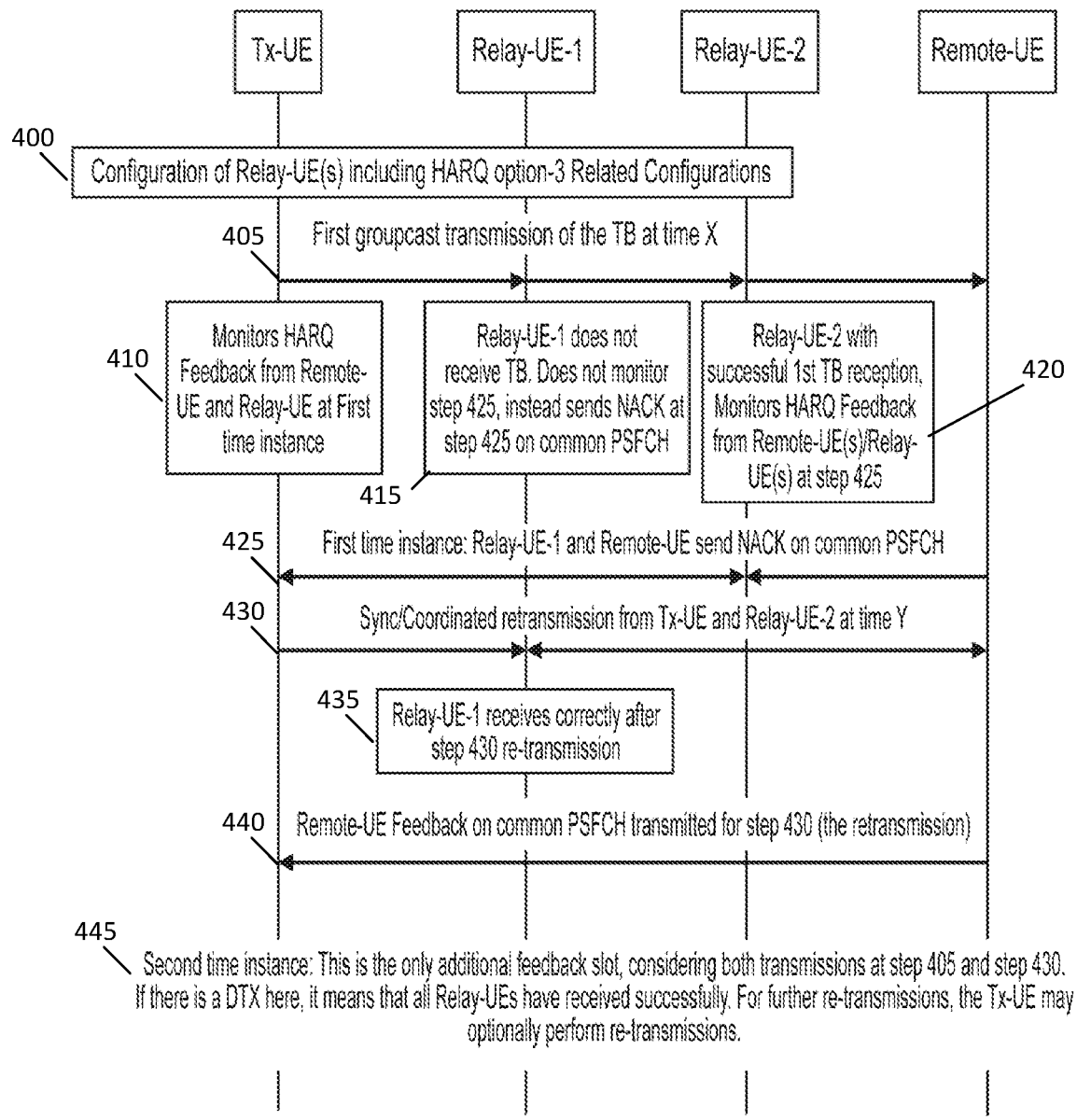
FIG. 4 illustrates another signal flow diagram between network elements, according to certain example embodiments.

FIG. 4 illustrates another example signal flow diagram between network elements, according to certain example embodiments. As illustrated in FIG. 4, at 400, the Tx-UE may configure Relay-UEs with HARQ option-3 related parameters. According to certain example embodiments, such mechanism may follow HARQ option-3 configurations such as in step 300 of FIG. 3. The HARQ option-3 shown in FIG. 4 is configured such that the second time instance at step 445 occurs after the two consecutive first time instances at steps 425 and 440. At 405, the Tx-UE may perform a first groupcast transmission at time X to both Relay-UE(s) and Remote-UE(s). To the Remote-UE(s), this transmission may appear as a standard groupcast transmission with HARQ option-1, whereas the Relay-UE(s) may be aware that this transmission corresponds to a HARQ option-3 process. At 410, the Tx-UE may monitor feedback from Remote-UE(s) and Relay-UE(s), respectively, at the first and second time instances on common PSFCH resources. This is under the consideration that the HARQ option-3 is based on option-1. Further, at 415, Relay-UE-1 and the Remote-UE(s) may not receive the TB transmitted at 405. As such, Relay-UE-1 and Remote-UE(s) may send NACK to the Tx-UE at the first time instance on PSFCH.

As further illustrated in FIG. 4, at 420, Relay-UE-2 may successfully receive the TB transmitted at 405 and, thus, Relay-UE-2 along with Tx-UE may monitor the common PSFCH resources at the first time instance for HARQ feedback from Remote-UE(s)/Relay-UE(s). At 425, at the first time instance, Relay-UE-1 and Remote-UE(s) may transmit NACK on the PSFCH for the unsuccessful reception of the TB transmitted by the Tx-UE. At 430, Relay-UE-1 may receive a sync/coordinated HARQ retransmission from the Tx-UE and Relay-UE-2 at time Y. In addition, at 435, Relay-UE-1 may successfully receive the retransmission. At 440, the Remote-UE(s) may send feedback on the common PSFCH transmitted for the retransmission at 430 at the corresponding first time instance. At 445, at the second time instance, considering both HARQ (re)transmissions at 405 and 430 and HARQ feedback thereof at 425 and 440, if there is a DTX received at the Tx-UE at 440 and 445, it may suggest to the Tx UE that the Relay-UE(s) and Remote-UE(s) have received the TB successfully. In certain example embodiments, the Tx-UE may optionally perform further retransmission to reassure that all the Relay UE(s) that received the TB correctly retransmit the TB at least once.

According to certain example embodiments, the Relay-UE(s) in the group may be preconfigured by the Tx-UE to retransmit the TB as soon as a NACK is monitored on the first time instance, when a Relay-UE has successfully received the TB from the Tx-UE. In certain example embodiments, the feedback to be transmitted by the Relay-UE(s) on the second time instance (e.g., FIG. 4, step 445) may be configured such that it is later than the Remote-UE feedback for the retransmission performed by the Relay-UE (e.g., FIG. 4, step 440). This may allow the Relay-UE which has retransmitted the TB to also monitor the Remote-UE feedback at step 440. That is, the second time instance may be configured to occur after a number of consecutive first time instances. This allows Relay-UE to monitor the feedback (e.g., FIG. 4, step 440) of more than one HARQ (re)transmissions (e.g., FIG. 4, step 430) before the Relay-UE can report the delivery/non-delivery of the TB to the Tx-UE in step 445.

Figure 5:
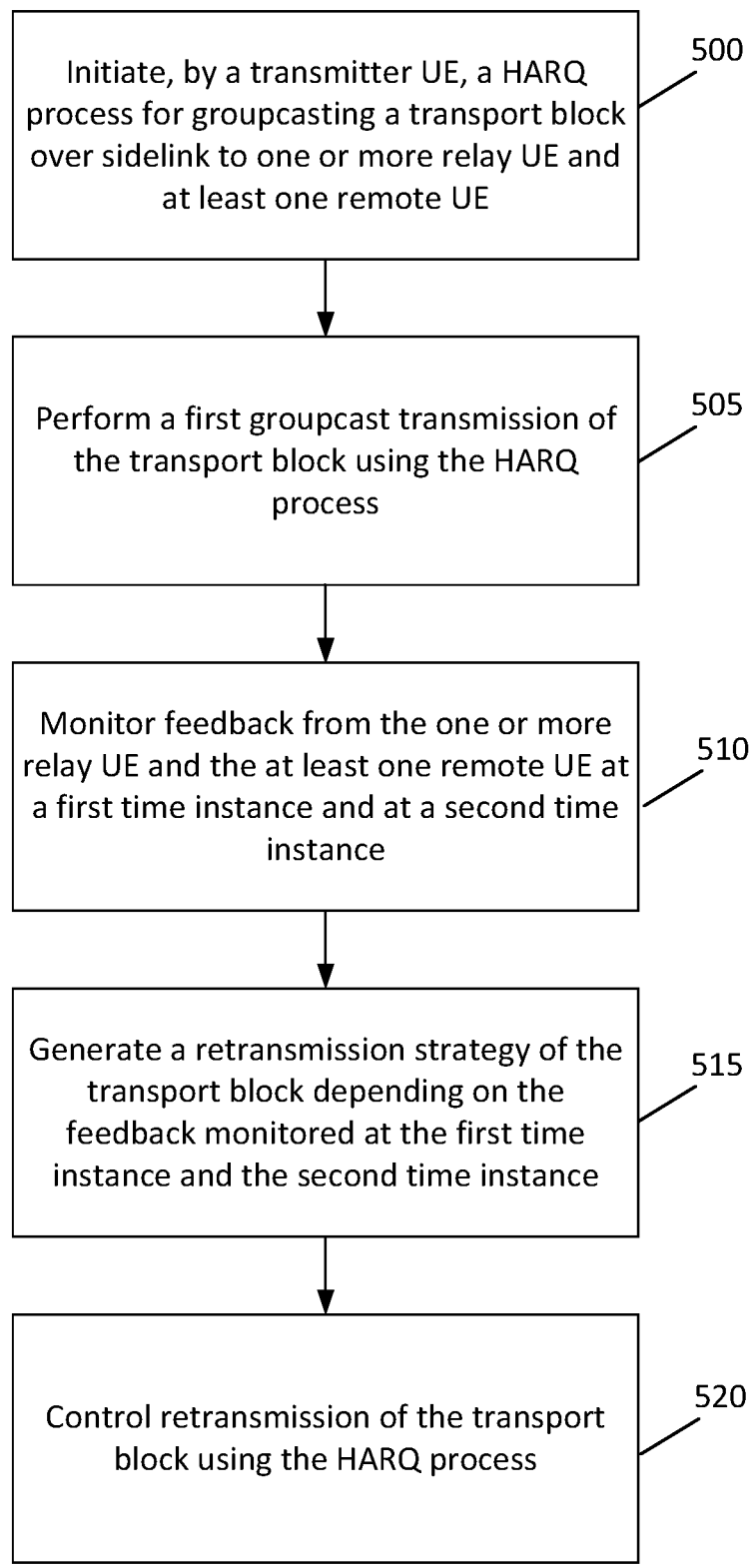
FIG. 5 illustrates a flow diagram of a method, according to certain example embodiments.

FIG. 5 illustrates a flow diagram of a method, according to certain example embodiments. In some example embodiments, the flow diagram of FIG. 5 may be performed by a telecommunications network entity or network node in a 3GPP system, such as LTE or 5G-NR. For instance, in certain example embodiments, the method of FIG. 5 may be performed by a UE such as a Tx-UE, for instance similar to apparatuses 10 or 20 illustrated in FIGS. 7(a) and 7(b).

According to certain example embodiments, the method of FIG. 5 may include, at 500, initiating, by a transmitter user equipment, a hybrid automatic repeat request process for groupcasting a transport block over sidelink to one or more relay user equipment and at least one remote user equipment. The method may also include, at 505, performing a first groupcast transmission of the transport block using the hybrid automatic repeat request process. The method may further include, at 510, monitoring feedback from the one or more relay user equipment and the at least one remote user equipment at a first time instance and at a second time instance. In addition, the method may include, at 515, generating a retransmission strategy of the transport block depending on the feedback monitored at the first time instance and the second time instance. Further, the method may include, at 520, controlling retransmission of the transport block using the hybrid automatic repeat request process based on the retransmission strategy.

According to certain example embodiments, the method may further include configuring the one or more relay user equipment and the at least one remote user equipment with hybrid automatic repeat request related configurations for the hybrid automatic repeat request process. According to other example embodiments, the hybrid automatic repeat request related configurations may differ between the one or more relay user equipment and the at least one remote user equipment. According to certain example embodiments, the feedback may be monitored on a first common physical sidelink feedback channel at the first time instance, and either on a second common physical sidelink feedback channel or on one or more dedicated physical sidelink feedback channels at the second time instance.

In certain example embodiments, the retransmission strategy may include, when receiving a negative acknowledgement at the first time instance, performing at least one of a retransmission of the transport block, controlling the one or more relay user equipment that has correctly received the transport block to perform the retransmission of the transport block, or configuring the one or more relay user equipment that has correctly received the transport block to monitor the feedback at the first time instance from the at least one remote user equipment. In further example embodiments, the retransmission strategy may include, when a negative acknowledgement is not received at the first time instance but is received at the second time instance, performing, at least one of a retransmission of the transport block, or controlling the one or more relay user equipment that has correctly received the transport block to perform the retransmission of the transport block.

According to further example embodiments, controlling retransmission of the transport block may include controlling the retransmission of the transport block from at least one of the one or more relay user equipment appear to the at least one remote user equipment as if the transport block was transmitted from the transmitter user equipment. According to other example embodiments, the method may further include receiving a negative acknowledgment at the second time instance on the common physical sidelink feedback channel. According to some example embodiments, the negative acknowledgment may indicate a successful reception of the transport block at at least one of the one or more relay user equipment, and a negative acknowledgement of the transport block received at the at least one of the one or more relay user equipment from at least one remote user equipment at the first time instance. In certain example embodiments, the method may further include receiving a negative acknowledgment at the second time instance on one of the one or more dedicated physical sidelink feedback channels. In some example embodiments, the negative acknowledgment may indicate a successful reception of the transport block at at least one of the one or more relay user equipment from which the negative acknowledgement is received, and a negative acknowledgement of the transport block received at the at least one of the one or more relay user equipment from at least one remote user equipment at the first time instance. In further example embodiments, the method may further include receiving a positive acknowledgment, from at least one of the one or more relay user equipment, at the second time instance on one of the one or more dedicated physical sidelink feedback channels. According to certain example embodiments, the positive acknowledgment may indicate a successful reception of the transport block at the at least one of the one or more relay user equipment, and that no negative acknowledgement to the reception of the transport block at the first time instance is received at the at least one of the one or more relay user equipment.

According to other example embodiments, the method may further include terminating the hybrid automatic repeat request process when no negative acknowledgement is received at the first time instance and the second time instance for the first groupcast transmission or a retransmission of the transport block, or when a maximum number of hybrid automatic repeat request transmissions is reached for the hybrid automatic repeat request process.

Figure 6:
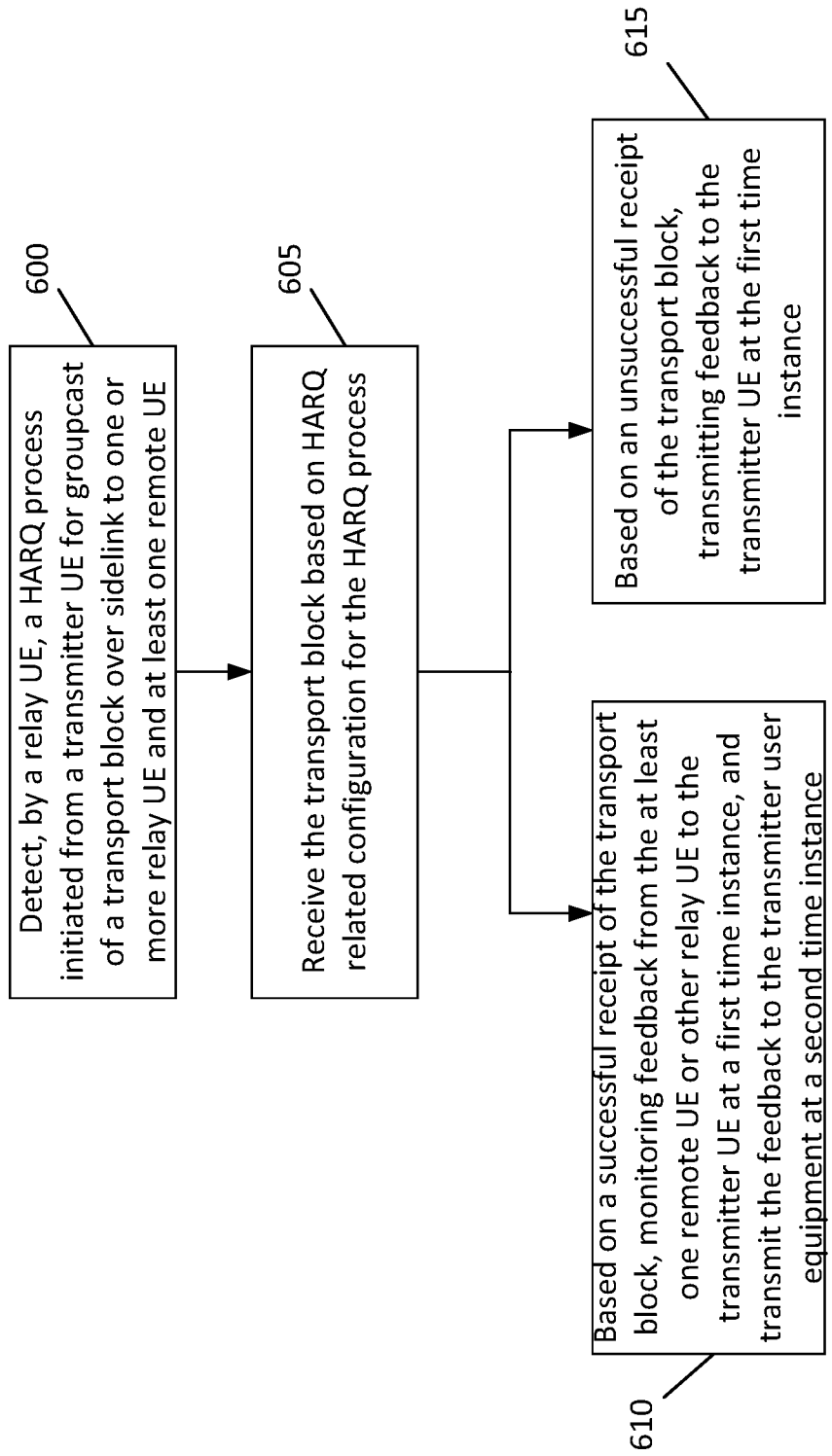
FIG. 6 illustrates a flow diagram of another method, according to certain example embodiments.

FIG. 6 illustrates a flow diagram of another method, according to certain example embodiments. In an example embodiment, the method of FIG. 6 may be performed by a telecommunications network entity or network node in a 3GPP system, such as LTE or 5G-NR. For instance, in certain example embodiments, the method of FIG. 6 may be performed by a UE such as a Relay-UE and/or a Remote-UE, for instance similar to apparatuses 10 or 20 illustrated in FIGS. 7(a) and 7(b).

According to certain example embodiments, the method of FIG. 6 may include, at 600, detecting, by a relay user equipment, a hybrid automatic repeat request process initiated from a transmitter user equipment for groupcast of a transport block over sidelink to one or more relay user equipment and at least one remote user equipment. The method may also include, at 605, receiving the transport block according to based on hybrid automatic repeat request related configuration for the hybrid automatic repeat request process. According to other example embodiments, the relay user equipment may prepare or attempt to receive the transport block based on hybrid automatic repeat request related configuration for the hybrid automatic repeat request process. The method may further include, at 610, based on a successful receipt of the transport block, monitoring feedback from the at least one remote user equipment or other relay user equipment to the transmitter user equipment at a first time instance, and transmitting the feedback to the transmitter user equipment at a second time instance. Further, the method may include, at 615, based on an unsuccessful receipt of the transport block, transmitting feedback to the transmitter user equipment at the first time instance.

In certain example embodiments, the one or more relay user equipment may include the relay user equipment and the other relay user equipment. In other example embodiments, the method may further include, based on a successful receipt of the transport block, relaying the transport block to the at least one remote user equipment or the other relay user equipment based on the hybrid automatic repeat request related configuration for the hybrid automatic repeat request process. In further example embodiments, the relaying may be transparent to the at least one remote user equipment. In some example embodiments, the method may further include, based on a successful receipt of the transport block, transmitting a negative acknowledgment at the second time instance on a common physical sidelink feedback channel. In certain example embodiments, the negative acknowledgment may indicate a successful reception of the transport block at the relay user equipment, and a negative acknowledgment of the transport block received at the relay user equipment from the at least one remote user equipment at the first time instance.

According to certain example embodiments, the method may also include, based on a successful receipt of the transport block, transmitting a negative acknowledgment at the second time instance on a dedicated physical sidelink feedback channel. According to some example embodiments, the negative acknowledgment may indicate a successful reception of the transport block at the relay user equipment, and a negative acknowledgment of the transport block received at the relay user equipment from the at least one remote user equipment at the first time instance. According to other example embodiments, the method may further include, based on a successful receipt of the transport block, transmitting a positive acknowledgment at the second time instance on a dedicated physical sidelink feedback channel. According to further example embodiments, the positive acknowledgment may indicate a successful reception of the transport block at the relay user equipment, and that no negative acknowledgment to reception of the transport block at the first time instance is received at the relay user equipment from the at least one remote user equipment or the other relay user equipment. In some example embodiments, the method may further include skipping transmission of the feedback at the second time instance on a dedicated physical sidelink feedback channel. In certain example embodiments, the method may further include, based on a successful receipt of the transport block, when a retransmission of the transport block is scheduled before the second time instance, transmitting the transport block before transmitting the feedback at the second time instance. In some example embodiments, transmitting the transport block may be performed regardless of whether a negative acknowledgment was received at the first time instance for the transport block. In other example embodiments, the method may further include performing a retransmission of the transport block, wherein the retransmission of the transport block is synchronized with a retransmission of the transmitter user equipment.

Figure 7A:
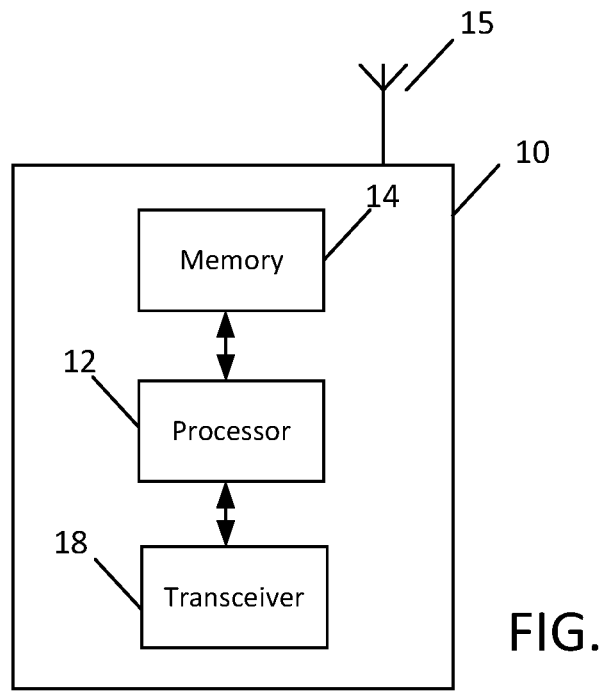
FIG. 7(a) illustrates an apparatus, according to certain example embodiments.

FIG. 7(a) illustrates an apparatus 10 according to certain example embodiments. In an embodiment, apparatus 10 may be a network element in a communications network or associated with such a network, such as a Tx-UE, or other similar device. It should be noted that one of ordinary skill in the art would understand that apparatus 20 may include components or features not shown in FIG. 7(a).

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7(a).

As illustrated in the example of FIG. 7(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors, DSPs, field-programmable gate arrays, FPGAs, application-specific integrated circuits, ASICs, and processors based on a multi-core processor architecture, as examples. While a single processor 12 is shown in FIG. 7(a), multiple processors may be utilized according to other embodiments. For example, it should be understood that, in certain example embodiments, apparatus 10 may include two or more processors that may form a multiprocessor system, for example in this case processor 12 may represent a multiprocessor, that may support multiprocessing. According to certain example embodiments, the multiprocessor system may be tightly coupled or loosely coupled, for example to form a computer cluster.

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-5.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory, RAM, read only memory, ROM, static storage such as a magnetic or optical disk, hard disk drive, HDD, or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-5.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface, for example, a modem, coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform, IFFT, module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to initiate a hybrid automatic repeat request process for groupcasting a transport block over sidelink to one or more relay user equipment and at least one remote user equipment. Apparatus 10 may also be controlled by memory 14 and processor 12 to perform a first groupcast transmission of the transport block using the hybrid automatic repeat request process. Apparatus 10 may further be controlled by memory 14 and processor 12 to monitor feedback from the one or more relay user equipment and the at least one remote user equipment at a first time instance and at a second time instance. In addition, apparatus 10 may be controlled by memory 14 and processor 12 to generate a retransmission strategy of the transport block depending on the feedback monitored at the first time instance and the second time instance. Further, apparatus 10 may be controlled by memory 14 and processor 12 to control retransmission of the transport block using the hybrid automatic repeat request process based on the retransmission strategy.

Figure 7B:
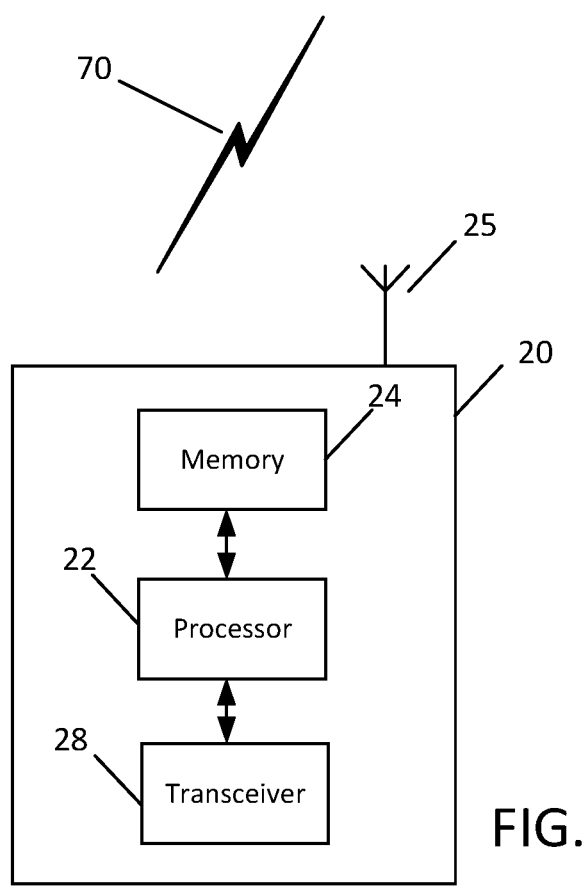
FIG. 7(b) illustrates another apparatus, according to certain example embodiments.

FIG. 7(b) illustrates an apparatus 20 according to certain example embodiments. In an example embodiment, the apparatus 20 may be a network element in a communications network or associated with such a network, such as a Relay-UE or a Remote-UE, or other similar device. It should be noted that one of ordinary skill in the art would understand that apparatus 20 may include components or features not shown in FIG. 7(b).

As illustrated in the example of FIG. 7(b), apparatus 20 may include a processor 22 for processing information and executing instructions or operations. Processor 22 may be any type of general or specific purpose processor. For example, processor 22 may include one or more of general-purpose computers, special purpose computers, microprocessors, DSPs, FPGAs, ASICs, and processors based on a multi-core processor architecture, as examples. While a single processor 22 is shown in FIG. 7(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-4 and 6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of RAM, ROM, static storage such as a magnetic or optical disk, HDD, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-4 and 6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s)25. The radio interfaces may correspond to a plurality of radio access technologies including one or more of GSM, NB-IoT, LTE, 5G, WLAN, Bluetooth, BT-LE, NFC, RFID, UWB, MulteFire, and the like. The radio interface may include components, such as filters, converters (for example, digital-to-analog converters and the like), mappers, a FFT module, and the like, to generate symbols for a transmission via one or more downlinks and to receive symbols, for example, via an uplink.

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations, for example analog and/or digital circuitry, combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a be a network element, a node, host, or server in a communication network or serving such a network. For example, apparatus 20 may be a C-SON, SON, or other similar device associated with a RAN, such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to detect a hybrid automatic repeat request process initiated from a transmitter user equipment for groupcast of a transport block over sidelink to one or more relay user equipment and at least one remote user equipment. Apparatus 20 may also be controlled by memory 24 and processor 22 to receive the transport block according to based on hybrid automatic repeat request related configuration for the hybrid automatic repeat request process. Apparatus 20 may further be controlled by memory 24 and processor 22 to, based on a successful receipt of the transport block, monitor feedback from the at least one remote user equipment or other relay user equipment to the transmitter user equipment at a first time instance, and transmit the feedback to the transmitter user equipment at a second time instance. Further, apparatus 20 may be controlled by memory 24 and processor 22 to, based on an unsuccessful receipt of the transport block, transmit feedback to the transmitter user equipment at the first time instance.

Further example embodiments may provide means for performing any of the functions or procedures described herein. For example, certain example embodiments may be directed to an apparatus that includes means for initiating, by a transmitter user equipment, a hybrid automatic repeat request process for groupcasting a transport block over sidelink to one or more relay user equipment and at least one remote user equipment. The apparatus may also include means for performing a first groupcast transmission of the transport block using the hybrid automatic repeat request process. The apparatus may further include means for monitoring feedback from the one or more relay user equipment and the at least one remote user equipment at a first time instance and a second time instance. In addition, the apparatus may include means for generating a retransmission strategy of the transport block depending on the feedback monitored at the first time instance and the second time instance. Further, the apparatus may include means for controlling retransmission of the transport block using the hybrid automatic repeat request process based on the retransmission strategy.

Other example embodiments may be directed to a further apparatus that includes means for detecting, by a relay user equipment, a hybrid automatic repeat request process initiated from a transmitter user equipment for groupcast of a transport block over sidelink to one or more relay user equipment and at least one remote user equipment. The apparatus may also include means for receiving the transport block according to based on hybrid automatic repeat request related configuration for the hybrid automatic repeat request process. The apparatus may further include means for, based on a successful receipt of the transport block, monitoring feedback from the at least one remote user equipment or other relay user equipment to the transmitter user equipment at a first time instance, and transmitting the feedback to the transmitter user equipment at a second time instance. In addition, the apparatus may include means for, based on an unsuccessful receipt of the transport block, transmitting feedback to the transmitter user equipment at the first time instance.

Certain example embodiments described herein provide several technical improvements, enhancements, and/or advantages. In some example embodiments, it may be possible to provide a method to seamlessly integrate relay-capable groupcast members in a HARQ/retransmission process of a tight cooperation between/among the Tx-UE and Relay-UEs. It may also be possible to apply such method(s) to cases where some of the group members are of 3GPP Rel-16. In addition, due to the HARQ option-3, certain example embodiments may provide methods to increase the reliability of groupcast transmissions by allowing Relay-UEs to monitor the feedback transmitted by the non-relay members in the group. Further, the feedback monitoring of the relay UEs may help relay selection for the Tx-UE. According to other example embodiments, it may be possible to provide fast, reliable, and efficient use of resources (e.g., both transmission and feedback resources).

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit, ASIC, a programmable gate array, PGA, a field programmable gate array, FPGA, or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation, 4G, technology.

Partial Glossary:
3GPP $3^{rd}$ Generation Partnership Project
4G $4^{th}$ Generation Wireless Technology
5G $5^{th}$ Generation Wireless Technology
ACK Positive Acknowledgment
DST Destination
DXT Discontinuous Transmission
eNB Enhanced Node B
gNB 5G or NR Base Station
HARQ Hybrid automatic Repeat Request
IC In Coverage
LTE Long Term Evolution
NACK Negative Acknowledgment
NR New Radio
OoC Out-of-Coverage
PSCCH Physical Sidelink Control Channel
PSFCH Physical Sidelink Feedback Channel
PSSCH Physical Sidelink Shared Channel
Relay-UE Relay UE
Rx UE Receiver UE
SCI Sidelink Control Information
SL Sidelink
SN Sequential Number
SRC Source
TB Transport Block
Tx-UE Transmitter UE
UE User Equipment

We claim:
1. An apparatus, comprising:
at least one processor; and
at least one memory comprising computer program code,
the at least one memory and the computer program code are configured, with the at least one processor to cause the apparatus at least to:
initiate a hybrid automatic repeat request process for groupcasting a transport block over sidelink to one or more relay user equipment and at least one remote user equipment;

configure the one or more relay user equipment and the at least one remote user equipment with hybrid automatic repeat request related configurations for the hybrid automatic repeat request process, wherein the hybrid automatic repeat request related configurations differ between the one or more relay user equipment and the at least one remote user equipment;

perform a first groupcast transmission of the transport block using the hybrid automatic repeat request process;

monitor feedback from the one or more relay user equipment and the at least one remote user equipment at a first time instance and a second time instance, wherein the feedback is monitored on a first common physical sidelink feedback channel at the first time instance, and either on a second common physical sidelink feedback channel or on one or more dedicated physical sidelink feedback channels at the second time instance;

receive a negative acknowledgment at the second time instance on the common physical sidelink feedback channel, wherein the negative acknowledgment indicates a successful reception of the transport block at the one or more relay user equipment, and a negative acknowledgement of the transport block received at the one or more relay user equipment from at least one remote user equipment at the first time instance;

generate a retransmission strategy of the transport block depending on the feedback monitored at the first time instance and the second time instance, wherein the retransmission strategy comprises:

performing, when receiving a negative acknowledgement at the first time instance:

a retransmission of the transport block, controlling the one or more relay user equipment that has correctly received the transport block to perform the retransmission of the transport block, and configuring the one or more relay user equipment that has correctly received the transport block to monitor the feedback at the first time instance from the at least one remote user equipment; and performing, when a negative acknowledgement is not received at the first time instance but is received at the second time instance:

a retransmission of the transport block, and controlling the one or more relay user equipment that has correctly received the transport block to perform the retransmission of the transport block;

control retransmission of the transport block using the hybrid automatic repeat request process based on the retransmission strategy, wherein controlling retransmission of the transport block comprises controlling the retransmission of the transport block from the one or more relay user equipment to appear to the at least one remote user equipment as if the transport block was transmitted from the apparatus; and terminate the hybrid automatic repeat request process when no negative acknowledgement is received at the first time instance and the second time instance for the first groupcast transmission or a retransmission of the transport block, or when a maximum number of hybrid automatic repeat request transmissions is reached for the hybrid automatic repeat request process.

* * * * *